United States Patent

Hirashima et al.

[11] Patent Number: 6,043,998
[45] Date of Patent: Mar. 28, 2000

[54] VOLTAGE MULTIPLYING DEVICE

[75] Inventors: Hiroyuki Hirashima, Vancouver, Wash.; Masahiko Monomohshi, Kashihara, Japan

[73] Assignee: Sharp Kabushiki Kaisha, Osaka, Japan

[21] Appl. No.: 09/333,272

[22] Filed: Jun. 15, 1999

[30] Foreign Application Priority Data

Jun. 25, 1998 [JP] Japan .................................. 10-179106

[51] Int. Cl.[7] .................................................... H02M 3/18
[52] U.S. Cl. ................... 363/59; 363/60; 307/110
[58] Field of Search ................... 363/59, 60, 61; 307/110, 109; 257/536, 537

[56] References Cited

U.S. PATENT DOCUMENTS

| | | | |
|---|---|---|---|
| 4,675,795 | 6/1987 | Takamura et al. | 363/61 |
| 4,716,512 | 12/1987 | Takamura et al. | 363/61 |
| 5,043,858 | 8/1991 | Watanabe | 363/61 |
| 5,397,931 | 3/1995 | Bayer | 327/306 |
| 5,414,614 | 5/1995 | Fette et al. | 363/59 |
| 5,481,447 | 1/1996 | Caris et al. | 363/60 |
| 5,486,992 | 1/1996 | Koscica et al. | 363/58 |
| 5,491,623 | 2/1996 | Jansen | 363/60 |
| 5,625,544 | 4/1997 | Kowshik et al. | 363/59 |
| 5,790,393 | 8/1998 | Fotoubi | 363/60 |
| 5,808,883 | 9/1998 | Hawkes | 363/60 |

FOREIGN PATENT DOCUMENTS 5276737 10/1993 Japan .

*Primary Examiner*—Peter S. Wong
*Assistant Examiner*—Bao Q. Vu

[57] ABSTRACT

A voltage multiplying device of the present invention is provided with: a voltage multiplication level setting circuit for setting a voltage multiplying level which indicates how many times the power source voltage is multiplied; a voltage multiplication pulse signal generating circuit for outputting a plurality of voltage multiplication pulse signals, each having a predetermined period and varying with a predetermined phase difference; a condition decoder circuit and a voltage multiplication pulse selecting circuit for outputting a voltage multiplication controlling signal, which varies in accordance with the determined voltage multiplication level, in synchronization with the pulse signal; and a voltage multiplication level outputting circuit for multiplying the power source voltage step by step to the set voltage multiplication level in accordance with the voltage multiplication controlling signal and for outputting the voltage multiplication level in each of the steps. This arrangement makes it possible to obtain a plurality of voltage multiplication levels by using a single voltage multiplying device, without changing a circuit connection.

7 Claims, 8 Drawing Sheets

VOLTAGE MULTIPLYING DEVICE

FIELD OF THE INVENTION

This invention is related to a voltage multiplying device, and is particularly concerned with a voltage multiplying device for setting a desired voltage which corresponds to an integral multiple of a source voltage, without changing an external circuit connection.

BACKGROUND OF THE INVENTION

Conventionally, a voltage multiplying circuit has been known, which is constituted by capacitors and switches and is capable of generating an intermediate voltage between one and two times larger than a source voltage(see Japanese Laid-Open Patent Application no. 5-276737(published on Oct. 22, 1993)).

Referring to FIG. 6, the following explanation discusses the conventional voltage multiplying circuit.

As shown in FIG. 6, the voltage multiplying circuit is constituted by a smoothing capacitor 1, an electric charge supplying capacitor 2, switches 3 through 6, a constant voltage element 7, and a power source 8. The switching of the switches 3 through 6 is controlled by a first and second clock signals(not shown) so as to generate an intermediate voltage one to two times larger than the power source 8, and then, the intermediate voltage is outputted from an output terminal 9.

As shown in FIG. 6, between the power source 8 and the output terminal 9, the smoothing capacitor 1 is provided, and the constant voltage element 7, the switch 3, and the switch 6 are connected in series. Between the power source 8 and a connecting point of the switches 3 and 6, the switch 5 and the electric charge supplying capacitor 2 are connected in series. Between the ground and a connecting point P of the electrical charge supplying capacitor 2 and the switch 5, the switch 4 is provided.

The first and second clock signals are arranged so as to have opposite phases each other. The switches 3 and 4 are switched so as to be synchronous to the first clock signal; meanwhile, the switches 5 and 6 are switched so as to be synchronous to the second clock signal.

The following explanation discusses an operation of the voltage multiplying circuit which has the above-mentioned construction. Here, VDD represents voltage of the power source 8, and $\Delta V$ represents a decrease in voltage of the constant voltage element 7.

When the switches 3 and 4 are closed in synchronization with the first clock signal, the power source 8, the constant voltage element 7, the switch 3, the electrical charge supplying capacitor 2, and the switch 4 form a closed circuit, so that the electric charge supplying capacitor 2 is charged with a voltage which is smaller than the voltage VDD by the voltage $\Delta V$(=VDD-$\Delta V$), which is a voltage drop of the constant voltage element 7.

And then, when the switches 3 and 4 are opened and the switches 5 and 6 are closed in synchronization with the second clock signal, the voltage VDD of the power source 8 is applied to the connecting point P so as to increase the voltage of the connecting point P by the voltage VDD. The voltage charged to the electric charge supplying capacitor 2 (VDD-$\Delta V$) is added to the voltage VDD of the connecting point P (=2VDD-$\Delta V$), and the added voltage is outputted as output voltage from the output terminal 9.

As described above, the voltage VDD of the power source 8 is doubled, is subtracted by a voltage drop of the constant voltage element 7, and is outputted from the output terminal 9. The constant voltage element 7 having a different rating is adopted so as to obtain a desired intermediate voltage which is one to two times the voltage VDD, in accordance with the constant voltage element 7.

Here, referring to FIGS. 7 and 8, the following explanation discusses another conventional voltage multiplying circuit which is constituted by capacitors and switches and which outputs a voltage which is twice the power source.

As shown in FIG. 7, a voltage multiplying circuit 20 is constituted by P channel MOSs 14 and 16, an N channel MOS 15, and a voltage multiplying capacitor C. The voltage multiplying circuit 20 is mainly composed of a voltage multiplying section 21 which doubles voltage, and inverter circuits 11 through 13 for controlling the voltage multiplying operation.

Both of the P channel MOS 14 and the N channel MOS 15 are pre-charging transistors. The output of the inverter circuit 12 is applied to the gate of the P channel MOS 14, and the power source voltage VEE is applied to the source of the P channel MOS 14. The output of the inverter circuit 11 is applied to the gate of the N channel MOS 15, and the source of the N channel MOS 15 is grounded. The voltage multiplying capacitor C is provided between the drains of the P channel MOS 14 and the N channel MOS 15.

An output terminal VOUT is extended from an electrode $CAP_+$, which is one of the electrodes of the voltage multiplying capacitor C, to the outside. The other electrode $CAP_-$ is connected to the drain of the P channel MOS 16. The power source voltage VEE is applied to the source of the P channel MOS 16, and the output of the inverter circuit 13 is applied to the gate of the P channel MOS 16.

An input signal IN2 shown in FIG. 8 is applied to the inverter circuit 13. Further, an input signal IN1 shown in FIG. 8 is applied to the inverter circuit 11. Additionally, the inverter circuit 11 and the inverter circuit 12 are cascaded.

Referring to FIG. 8, the following explanation discusses an operation of the voltage multiplying circuit having the above-mentioned construction.

When the input signals IN1 and IN2, which belong to a low level in a binary level(hereinafter, simply referred to as a low level), are respectively applied to the inverter circuits 11 and 13, signals which belong to a high level in a binary level (hereinafter, simply referred to as a high level) are respectively applied to the gates of the N channel MOS 15 and the P channel MOS 16. At this time, a low-level signal is applied to the gate of the P channel MOS 14.

With this arrangement, the P channel MOS 16 is turned off; meanwhile, the P channel MOS 14 and the N channel MOS 15 are turned on. As a result, the voltage multiplying capacitor C is charged by the power source voltage VEE, so that the voltage across the voltage multiplying capacitor C becomes virtually equal to the power source voltage VEE (corresponding to a period indicated by ① in FIG. 8).

And then, when the input signals IN1 and IN2 are changed from a low level to a high level, low-level signals are respectively applied to the gates of the N channel MOS 15 and the P channel MOS 16; meanwhile, a high-level signal is applied to the gate of the P channel MOS 14. With this arrangement, the P channel MOS 16 is turned on; meanwhile, the P channel MOS 14 and the N channel MOS 15 are turned off. At this time, the voltage of the electrode $CAP_-$ of the voltage multiplying capacitor C is increased from the ground level to the power source voltage VEE (see the wave of the signal $CAP_-$ in FIG. 8). As a result, (a) the power source voltage VEE charged during the period ① is added to (b) the increase in voltage of the electrode CAP_, that is the power source voltage VEE applied in response to the turn-on of the P channel MOS 16, so as to obtain 2VEE voltage(see the wave of the signal CAP_+ in FIG. 8) of the output terminal VOUT (corresponding to a period indicated by ③ in FIG. 8).

Moreover, with regard to the input signals IN2 and IN1, in order to prevent feedthrough current, a holding period is provided so as to prevent the input signals from being simultaneously changed from a low level to a high level, or from a high level to a low level (corresponding to periods ② and ④ of FIG. 8).

Referring to FIG. 9, the following explanation discusses still another conventional voltage multiplying circuit which can triple voltage by using the voltage multiplying circuit shown in FIG. 7. Here, for convenience of explanation, those members that have the same functions and that are shown in FIG. 7 are indicated by the same reference numerals and the description thereof is omitted.

This voltage multiplying circuit is basically obtained by combining a pair of the voltage multiplying circuits shown in FIG. 7. Additionally, the inverter circuits are commonly used for controlling on/off of the respective MOSs.

The voltage multiplying circuit of FIG. 9 is mainly constituted by: a voltage multiplying circuit 20 which is provided with the voltage multiplying section 21 shown in FIG. 7 (for convenience of explanation, hereinafter, referred to as a first voltage multiplying section 21); a second voltage multiplying section 22 which has the same circuit construction as the first voltage multiplying section 21 and which triples voltage; and an outputting section 25 which is provided with a P channel MOS 23 and a smoothing capacitor 24.

From an output terminal VOUT of the voltage multiplying circuit 20 (for convenience of explanation, hereinafter, referred to as an output terminal VOUT 21), the output is applied to the source of the P channel MOS16 of the second voltage multiplying section 22. The gates of P channel MOSs 14 of the first and second voltage multiplying sections 21 and 22 are connected to each other. Moreover, the gates of N channel MOSs 15 of the first and second voltage multiplying sections 21 and 22 are connected to each other. The gates of P channel MOSs 16 of the first and second voltage multiplying sections 21 and 22 are connected to each other.

From an output terminal VOUT of the second voltage multiplying section 22 (for convenience of explanation, hereinafter, referred to as an output terminal VOUT 22), the output is applied to the source of the P channel MOS 23. The drain of the P channel MOS 23 is extended to the outside as an output terminal 25. The gate of the P channel MOS 23 is connected to the gate of the N channel MOS 16 of the second voltage multiplying section 22. Further, the smoothing capacitor 24 is provided between the output terminal VOUT 25 and the ground.

The following explanation briefly discusses an operation of the voltage multiplying circuit which triples voltage with the above-mentioned construction. Here, the operation performed in the voltage multiplying circuit 20 has been already discussed; therefore, the explanation thereof is omitted. The following explanation describes an operation performed after the output of the voltage multiplying circuit 20 (=2VEE) has been applied to the second voltage multiplying section 22.

When low-level input signals IN1 and IN2 are respectively applied to the inverter circuits 11 and 13, in the second voltage multiplying section 22, high level signals are applied to the gates of the N channel MOS 15 and the P channel MOS 16; meanwhile, a low level signal is applied to the gate of the P channel MOS 14.

With this arrangement, in the second voltage multiplying section 22, the P channel MOS 16 is turned off; meanwhile, the P channel MOS 14 and the N channel MOS 15 are turned on. As a result, the voltage multiplying capacitor C is charged by the power source voltage VEE, so that the voltage across the multiplying capacitor C becomes virtually equal to the power source voltage VEE.

And then, when the input signals IN1 and IN2 are changed from a low level to a high level, in the second voltage multiplying section 22, low level signals are respectively applied to the gates of the N channel MOS 15 and the P channel MOS 16; meanwhile, a high level signal is applied to the gate of the P channel MOS 14. With this arrangement, the P channel MOS 16 is turned on; meanwhile, the P channel MOS 14 and the N channel MOS 15 are turned off, so that the voltage of the output terminal VOUT 21 is applied to the electrode CAP_ of the voltage multiplying capacitor C. As a result, the voltage of the electrode CAP_ is increased from the ground level to the 2VEE voltage level. Therefore, the power source voltage VEE that has been charged is added to the increase in voltage of the electrode CAP_, that is the power source voltage 2VEE applied in response to the turn-on of the P channel MOS 16, so as to obtain a 3VEE voltage of the output terminal VOUT 25. With this arrangement, voltage which is triple of the power source voltage is outputted from the voltage multiplying circuit.

Additionally, in the first and second voltage multiplying sections 21 and 22, the voltage multiplying capacitor C and the smoothing capacitor 24 are externally installed.

However, the conventional arts has the following problems:

Specifically, with regard to the conventional switched-capacitor voltage multiplying circuits of FIGS. 6 and 7, one voltage multiplying circuit can realize an intermediate voltage which is larger than the power source voltage by between one and two times, and a voltage multiplication level which is two times as large as the power source voltage; however, it is not possible to achieve a plurality of multiplication levels by using one voltage multiplying circuit.

For instance, a liquid crystal driving driver of a liquid crystal driving device requires relatively large voltage values as compared with a power source voltage of a general-purpose LSI. Furthermore, each maker normally requires different voltage values for the system construction, etc.; therefore, in order to meet the needs, it has been conventionally necessary to develop a liquid crystal driving driver for each power source specification of the user, resulting in poor versatility that imposes a considerable inconvenience on the user.

Further, with regard to the conventional voltage multiplying circuit of FIG. 9, if the wiring is changed, it is possible to switch the multiplication level so as to double or triple the power source voltage and to output the multiplied voltage; however, in this case, it is necessary to change the construction including the circuit wiring and the connection of the voltage multiplying capacitor C.

SUMMARY OF THE INVENTION

The present invention is devised in view of the above-mentioned problem. The objective of the present invention is to realize a plurality of voltage multiplication levels by using a single voltage multiplying device, without changing the arrangement including an external circuit connection.

In order to achieve the above-mentioned objective, the voltage multiplying device of the present invention is characterized by including: (1) a voltage multiplication level setting circuit for setting a voltage multiplying level which indicates how many times the power source voltage is multiplied, (2) a voltage multiplication pulse signal generating circuit for outputting a plurality of voltage multiplication pulse signals, each having a predetermined period and varying with a predetermined phase difference, (3) a voltage multiplication controlling circuit for outputting a voltage multiplication controlling signal, which varies in accordance with the determined voltage multiplication level, in synchronization with the voltage multiplication pulse signal, and (4) a voltage multiplication level outputting circuit for multiplying the power source voltage step by step to the set voltage multiplication level in accordance with the voltage multiplication controlling signal and for outputting the voltage multiplication level of each step.

According to the above-mentioned invention, the power source voltage is multiplied to a desired voltage multiplication level step by step and is outputted as follows:

Namely, a desired voltage multiplication level is set by the voltage multiplication level setting circuit. From the voltage multiplication pulse signal generating circuit, a plurality of voltage multiplication pulses are generated and respectively outputted to the voltage multiplication controlling circuit. Each of these voltage multiplication pulse signals has a predetermined period and varies with a predetermined phase difference.

The voltage multiplication controlling circuit generates the voltage multiplication controlling signal, which varies in accordance with the voltage multiplication level determined by the voltage multiplication level setting circuit, in synchronization with the voltage multiplication pulse signal, and outputs the voltage multiplication controlling signal to the voltage multiplication level outputting circuit. Upon reception of the voltage multiplication controlling signal, the voltage multiplication level outputting circuit multiplies the power source voltage step by step to the set voltage multiplication level in accordance with the voltage multiplication controlling signal, and outputs each of the levels of the step-by-step voltage multiplication. In this case, the voltage multiplication controlling signal is synchronous to the voltage multiplication pulse signal, so that each voltage multiplication is carried out in synchronization with the voltage multiplication pulse signal.

As described above, merely by setting the voltage multiplication level by using the voltage multiplication level setting circuit, the voltage multiplying operation is repeatedly performed in synchronization with each of the voltage multiplication pulses, the power source voltage is multiplied step by step to the set voltage multiplication level, and the voltage multiplication levels are respectively outputted. Therefore, it is not necessary to make the setting for each specification desired by the user, and it is possible to install the voltage multiplying device into any kind of system; consequently, commonality of the system can be readily realized. Furthermore, it is not necessary to change an external circuit element or a circuit wiring for each of the determined voltage multiplication levels, so that it is positively possible to provide the voltage multiplying device which is quite suitable for mass production.

For a fuller understanding of the nature and advantages of the invention, reference should be made to the ensuing detailed description taken in conjunction with the accompanying drawings.

DESCRIPTION OF THE EMBODIMENTS

Referring to FIGS. 1 through 5, the following explanation describes one embodiment of the present invention.

Figure 1:
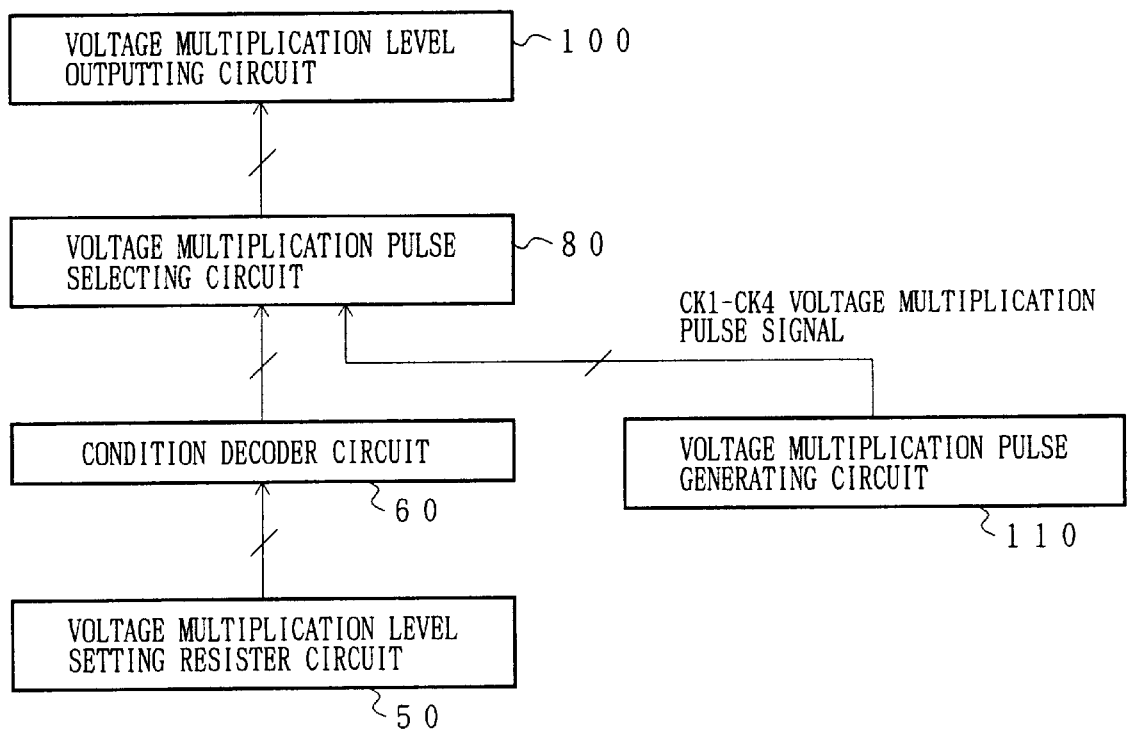
FIG. 1 is a block diagram showing a construction of a voltage multiplying device in accordance with the present invention.

FIG. 1 is a block diagram showing a construction of a voltage multiplying device in accordance with the present embodiment. As shown in FIG. 1, the voltage multiplying device is constituted by a voltage multiplication level setting resister 50, a condition decoder circuit 60, a voltage multiplication pulse selecting circuit 80, a voltage multiplication level outputting circuit 100, and a voltage multiplication pulse generating circuit 110. For convenience of explanation, the present embodiment describes the voltage multiplying device which can multiply voltage up to four times. However, the present invention is not limited to this embodiment but includes a voltage multiplying device which can multiply voltage by five or more times.

The voltage multiplication level setting resister circuit 50 is composed of members such as a latch circuit (not shown), and is capable of setting a desired multiplication level. For example, the voltage multiplication level is set by entering a command through a device such as an external input device. The voltage multiplying device described in the present embodiment can multiply voltage up to four times, so that the resister circuit merely needs to set 2-bit information. The number of bits of the resister circuit is determined as required in accordance with how many times voltage can be multiplied.

Figure 2:
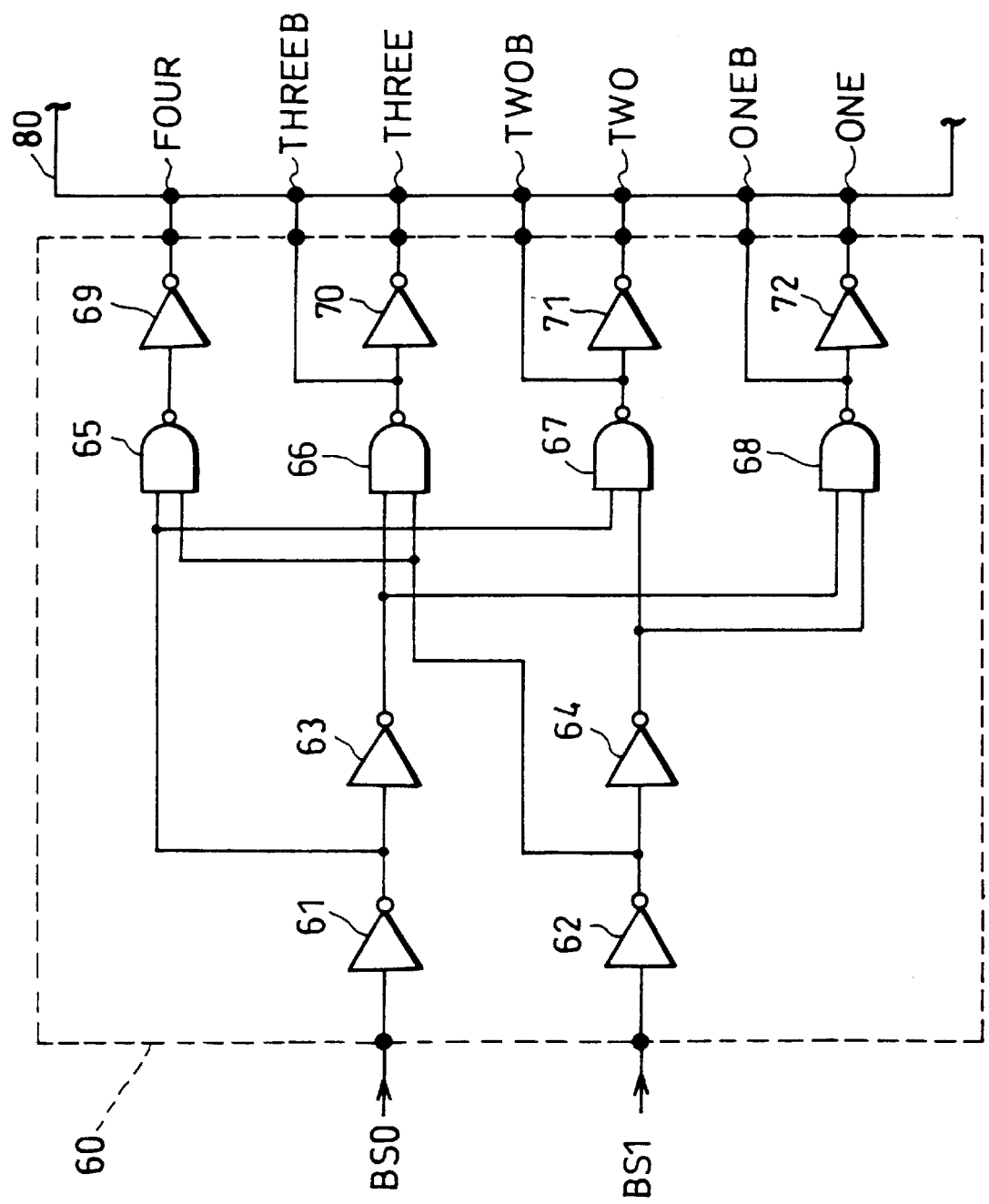
FIG. 2 is a circuit diagram showing an example of a circuit construction of a condition decoder circuit with regard to the voltage multiplying device.

To the condition decoder circuit 60, the voltage multiplication level setting resister circuit 50 transfers a two-bit resister value (2 bits of BS0 and BS1). As shown in FIG. 2, the condition decoder circuit 60 is constituted by inverter circuits 61 through 64, NAND circuits 65 through 68, and inverter circuits 69 through 72.

The resister values BS0 and BS1 are respectively inputted to the inverter circuits 61 and 62. The inverter circuit 61 and the inverter circuit 63 are cascaded with each other. The inverter circuit 62 and the inverter circuit 64 are cascaded with each other.

The output of the inverter circuit 61 is applied to one of the inputs of the NAND circuit 65. The output of the inverter circuit 62 is applied to the other input of the NAND circuit 65. The output of the inverter circuit 63 and the output of the inverter circuit 62 are inputted to the NAND circuit 66. The output of the inverter circuit 61 and the output of the inverter circuit 64 are inputted to the NAND circuit 67. The output of the inverter circuit 63 and the output of the inverter circuit 64 are inputted to the NAND circuit 68.

The output of the NAND circuit 65 is inputted to the inverter circuit 69. The output of the NAND circuit 66 is inputted to the inverter circuit 70. The output of the NAND circuit 67 is inputted to the inverter circuit 71. The output of the NAND circuit 68 is inputted to the inverter circuit 72.

The output of the inverter circuit 69 is transmitted to an input terminal FOUR of the voltage multiplication pulse selecting circuit 80. The input of the inverter circuit 70 is transmitted to an input terminal THREEB of the voltage multiplication pulse selecting circuit 80, and the output of the inverter circuit 70 is transmitted to an input terminal THREE. The input of the inverter circuit 71 is transmitted to an input terminal TWOB of the voltage multiplication pulse selecting circuit 80, and the output of the inverter circuit 71 is transmitted to an input terminal TWO of the voltage multiplication pulse selecting circuit 80. The input of the inverter circuit 72 is transmitted to an input terminal ONEB of the voltage multiplication pulse selecting circuit 80, and the output of the inverter circuit 72 is transmitted to an input terminal ONE of the voltage multiplication pulse selecting circuit 80.

In the voltage multiplying device of the present embodiment, when the resister values BS1 and BS0 are set at (BS1, BS0)=(0, 0), the voltage of the power source is multiplied by four. When the resister values BS1 and BS0 are set at (BS1, BS0)=(0, 1), the voltage of the power source is multiplied by three. When the resister values BS1 and BS0 are set at (BS1, BS0)=(1, 0), the voltage of the power source is multiplied by two. When the resister values BS1 and BS0 are set at (BS1, BS0)=(1, 1), the power source voltage is transmitted without multiplication.

Referring to FIG. 2, the following explanation discusses how a voltage multiplication level is determined in accordance with a combination of the resister values BS1 and BS0 in the condition decoder circuit 60.

As shown in FIG. 2, when the resister values BS1 and BS0 are set at (BS1, BS0)=(0, 0), the two inputs of the NAND circuit 65 become a high level; meanwhile, the output of the NAND circuit 65 becomes a low level. Therefore, the output of the inverter circuit 69 becomes a high level. Meanwhile, one of the inputs of the NAND circuits 66 through 68 becomes a low level; thus, the outputs of the NAND circuits 66 through 68 become a high level. Therefore, the outputs of the inverter circuits 70 through 72 become a low level. Namely, in the voltage multiplication pulse selecting circuit 80, merely the input terminal FOUR receives a high-level signal, while the other input terminals (THREE, TWO, and ONE) receive low-level signals; therefore, the voltage multiplication pulse selecting circuit 80 recognizes that the multiplication level is adjusted at four times the power source voltage.

When the resister values BS1 and BS0 are set at (BS1, BS0)=(0, 1), the two inputs of the NAND circuit 66 become a high level; meanwhile, the output of the NAND circuit 66 becomes a low level. Therefore, the output of the inverter circuit 70 becomes a high level. Meanwhile, one of the inputs of the NAND circuits 65, 67, and 68 becomes a low level; thus, the outputs of the NAND circuits 65, 67 and 68 become a high level. Therefore, the outputs of the inverter circuits 69, 71, and 72 become a low level. Namely, in the voltage multiplication pulse selecting circuit 80, merely the input terminal THREE receives a high-level signal, while the other input terminals (FOUR, TWO, and ONE) receive low-level signals; therefore, the voltage multiplication pulse selecting circuit 80 recognizes that the multiplication level is adjusted at three times the power source voltage.

When the resister values BS1 and BS0 are set at (BS1, BS0)=(1, 0), the two inputs of the NAND circuit 67 become a high level; meanwhile, the output of the NAND circuit 67 becomes a low level. Therefore, the output of the inverter circuit 71 becomes a high level. Meanwhile, one of the inputs of the NAND circuits 65, 66 and 68 becomes a low level; thus, the outputs of the NAND circuits 65, 66 and 68 become a high level. Therefore, the outputs of the inverter circuits 69, 70 and 72 become a low level. Namely, in the voltage multiplication pulse selecting circuit 80, merely the input terminal TWO receives a high-level signal, while the other input terminals (FOUR, THREE, and ONE) receive low-level signals; therefore, the voltage multiplication pulse selecting circuit 80 recognizes that the multiplication level is adjusted at twice the power source voltage.

When the resister values BS1 and BS0 are set at (BS1, BS0)=(1, 1), the two inputs of the NAND circuit 68 become a high level; meanwhile, the output of the NAND circuit 68 becomes a low level. Therefore, the output of the inverter circuit 72 becomes a high level. Meanwhile, one of the inputs of the NAND circuits 65 through 67 becomes a low level; thus, the outputs of the NAND circuits 65 through 67 become a high level. Therefore, the outputs of the inverter circuits 69 through 71 become a low level. Namely, in the voltage multiplication pulse selecting circuit 80, merely the input terminal ONE receives a high-level signal, while the other input terminals (FOUR, THREE, and TWO) receive low-level signals; therefore, the voltage multiplication pulse selecting circuit 80 recognizes that the multiplication level is adjusted at one time of the power source voltage. Namely, the power source voltage is outputted just as it is.

Moreover, the input terminals THREEB, TWOB, and ONEB respectively receive signals whose binary logic levels are inverse to those of the signals inputted to the input terminals THREE, TWO, and ONE. Further, the condition decoder circuit 60 is not limited to the construction of FIG. 2. For, example, it is also possible to provide members such as a data selector and ROM(Read Only Memory).

As described above, to the input terminals FOUR, THREE, TWO, and ONE of the voltage multiplication pulse selecting circuit 80, the outputs of the inverter circuits 69 through 72 of the condition decoder circuit 60 are respectively applied. Moreover, to the input terminals THREEB, TWOB, and ONEB of the voltage multiplication pulse selecting circuit 80, as described above, the inputs of the inverter circuits 70 through 72 (outputs of the NAND circuits 66 through 68) are respectively applied. The voltage multiplication pulse selecting circuit 80 has other input terminals including input terminals CK1 through CK4. To these input terminals, the voltage multiplication pulse signals CK1 through CK4 of FIG. 5 are applied from the voltage multiplication pulse generating circuit 110.

Figure 5:
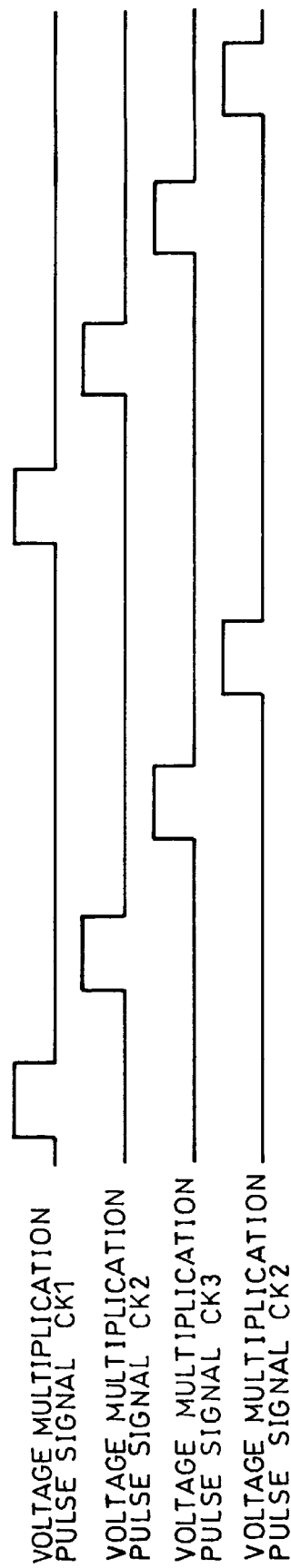
FIG. 5 is a wave form chart showing waves of pulse signals outputted from a voltage multiplication pulse generating circuit of the voltage multiplying device.
Figure 6:
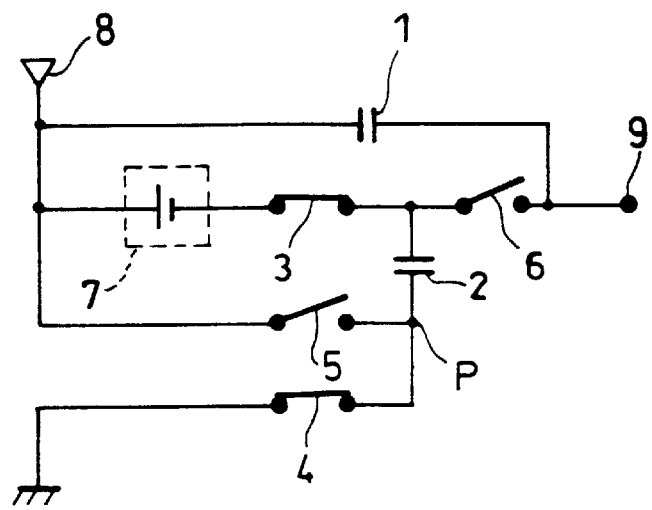
FIG. 6 is a circuit diagram showing a construction example of the conventional voltage multiplying device.
Figure 7:
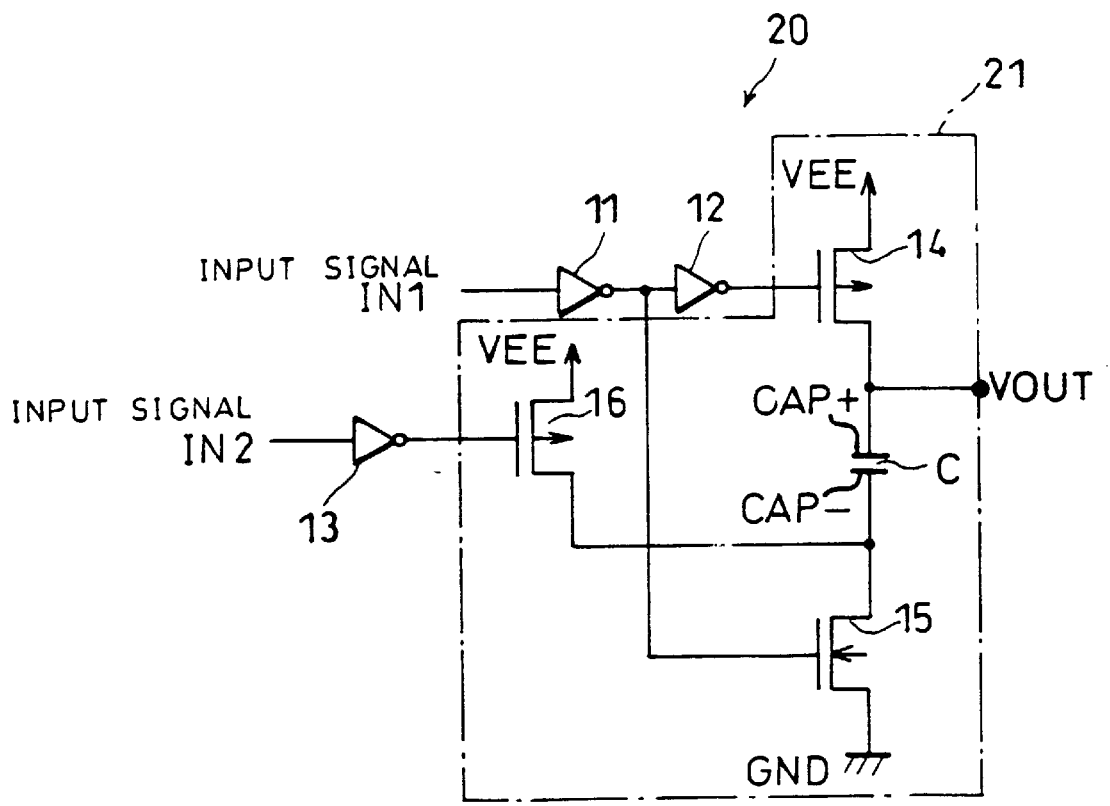
FIG. 7 is a circuit diagram showing another construction example of the conventional voltage multiplying device.
Figure 8:
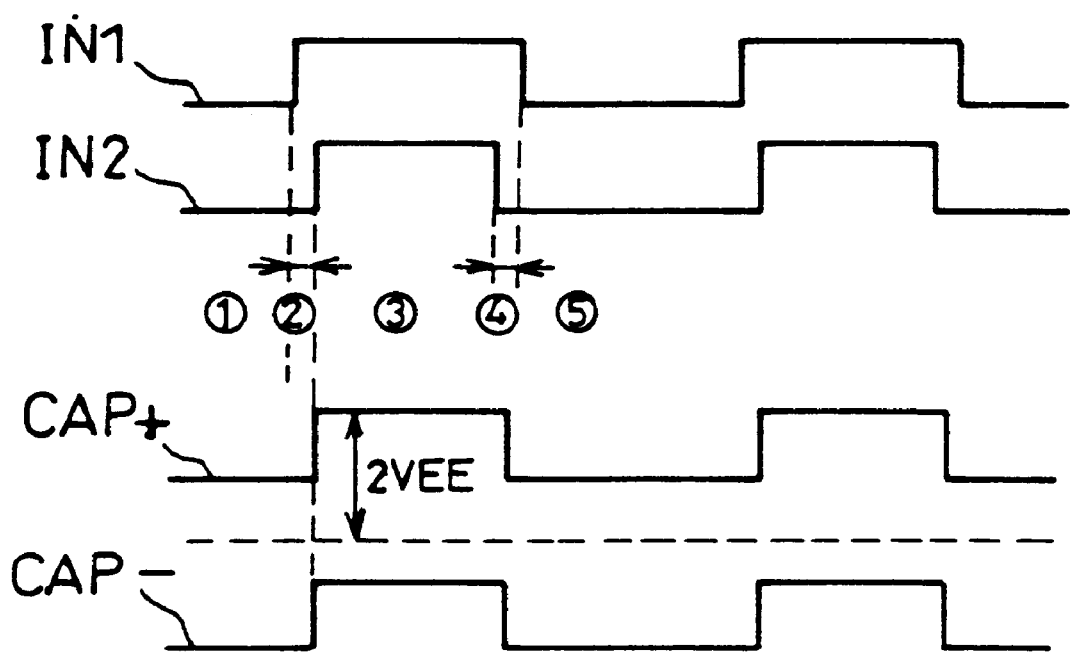
FIG. 8 is a timing chart of main members of the voltage multiplying device shown in FIG. 8.
Figure 9:
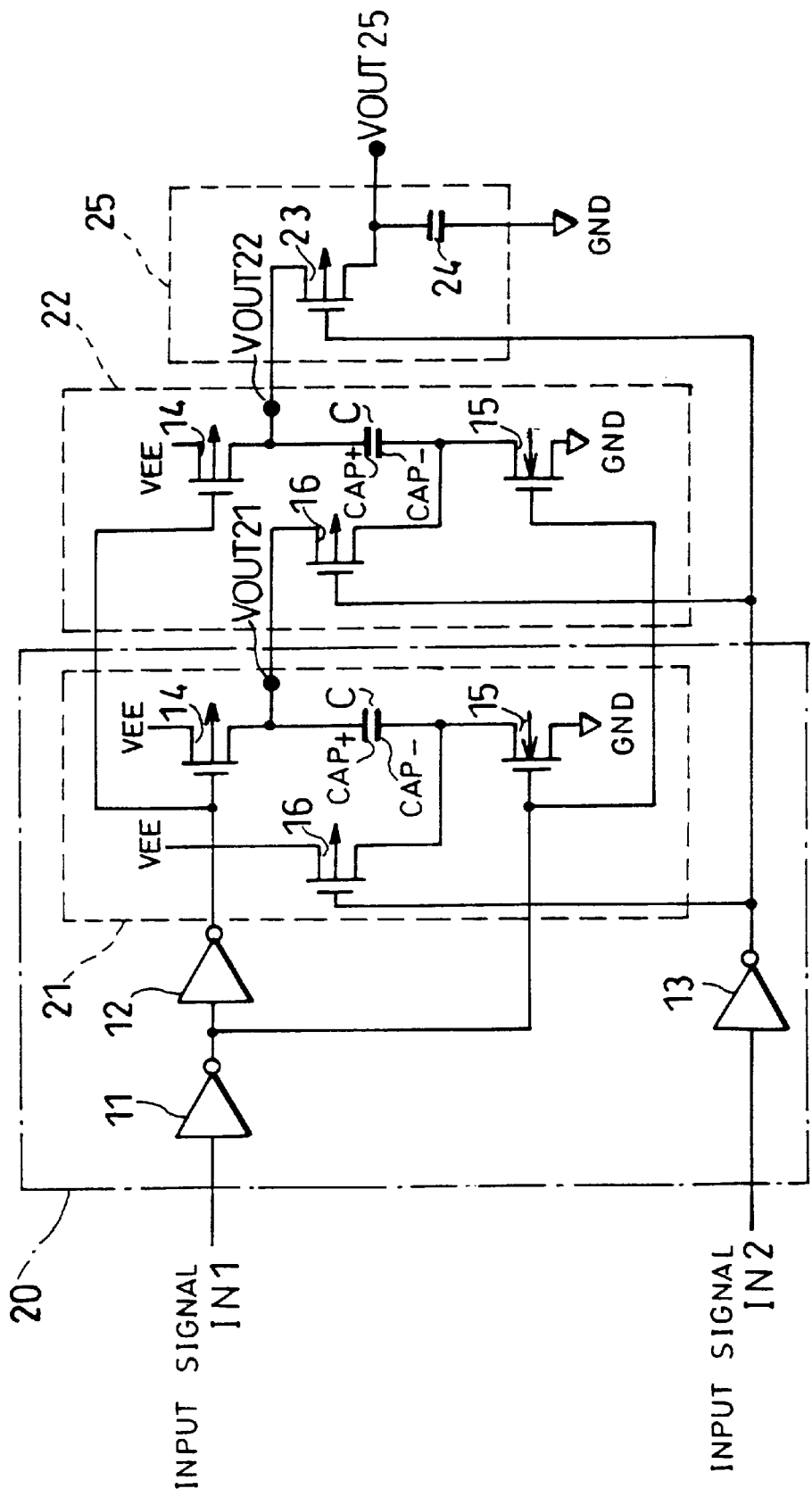
FIG. 9 is a circuit diagram showing still another construction example of the conventional voltage multiplying device.

FIG. 5 shows an example in which the voltage multiplication pulse signals CK1 through CK4 vary with the same period and a predetermined phase difference. The present invention is not limited to this example, so that the respective periods and/or phase differences can be different from one another. It is merely necessary to determine the respective periods and phases so as to allow smoothing capacitors C20, C30, and C40 (described later) to stably maintain predetermined voltages (respectively referred to as 2VEE, 3VEE, and 4VEE) thereacross. Additionally, a circuit, which generates pulse signals having the phase relationship shown in FIG. 5, has been known well; therefore, the specific construction of the voltage multiplication pulse generating circuit 110 is not described.

Figure 3:
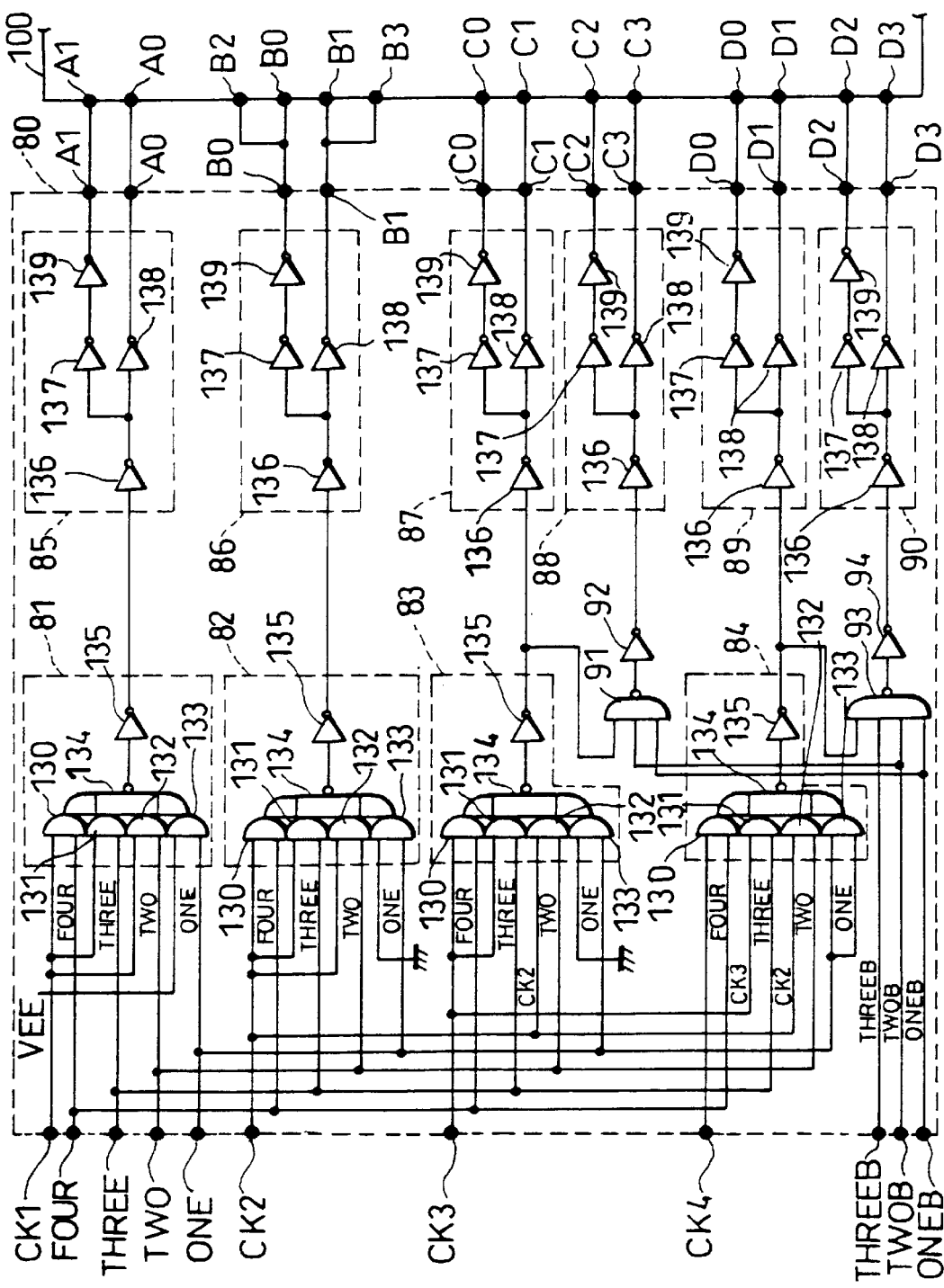
FIG. 3 is a circuit diagram showing an example of a circuit construction of a voltage multiplication pulse selecting circuit with regard to the voltage multiplying device.

As shown in FIG. 3, the voltage multiplication pulse selecting circuit 80 is constituted by selecting sections 81 through 84, voltage multiplication controlling signal generating sections 85 through 90, an NAND circuit 91 having three inputs, an inverter circuit 92, an NAND circuit 93 having four inputs, and an inverter circuit 94.

Each of the selecting sections 81 through 84 has the same circuit construction; therefore, the merely selecting section 81 is fully described and the explanations on the selecting sections 82 through 84 are omitted. Furthermore, each of the voltage multiplication controlling signal generating sections 85 through 90 has the same circuit construction; therefore, merely the voltage multiplication controlling signal generating sections 85 is fully described, and the explanations on the voltage multiplication controlling signal generating sections 86 through 90 are omitted.

The selecting section 81 is constituted by four AND circuits 130 through 133 having two inputs, an NOR circuit 134 which has four inputs and performs an NOR operation for the outputs of the AND circuits 130 through 133, and an inverter circuit 135 for changing the output of the NOR circuit 134.

In the selecting section 81, the input terminals of the AND circuit 130 are connected with the input terminal CK1 and the input terminal FOUR. The input terminals of the AND circuit 131 are connected with the input terminal CK1 and the input terminal THREE. The input terminals of the AND circuit 132 are connected with the input terminal CK1 and the input terminal TWO. The input terminals of the AND circuit 133 are connected with the power source voltage VEE and the input terminal ONE.

From the selecting section 81, the output of the inverter circuit 135 is transmitted to an inverter 136 of the voltage multiplication controlling signal generating section 85. In the voltage multiplication controlling signal generating section 85, the output of the inverter circuit 136 is transmitted via inverter circuits 137 and 139 to an output terminal A1. Further, the output of the inverter circuit 136 is transmitted via an inverter circuit 138 to an output terminal A0.

In the selecting section 82, the input terminals of an AND circuit 130 are connected with the input terminal CK2 and the input terminal FOUR. The input terminals of an AND circuit 131 are connected with the input terminal CK2 and the input terminal THREE. The input terminals of an AND circuit 132 are connected with the input terminal CK2 and the input terminal TWO. The input terminals of an AND circuit 133 are connected with the ground and the input terminal ONE.

In the selecting section 82, the output of an inverter circuit 135 is transmitted to an inverter circuit 136 of the voltage multiplication controlling signal generating section 86. In the voltage multiplication controlling signal generating section 86, the output of the inverter circuit 136 is transmitted via inverter circuits 137 and 139 to an output terminal B0 and an output terminal B2. Moreover, the output of the inverter circuit 136 is transmitted via the inverter circuit 138 to an output terminal B1 and an output terminal B3.

In the selecting section 83, the output terminals of an AND circuit 130 are connected with the input terminal CK3 and the input terminal FOUR. The input terminals of an AND circuit 131 are connected with the input terminal CK3 and the input terminal THREE. The input terminals of an AND 132 are connected with the input terminal CK2 and the input terminal TWO. The input terminals of an AND circuit 133 are connected with the ground and the input terminal ONE.

From the selecting section 83, the output of an inverter circuit 135 is transmitted to an inverter circuit 136 of the voltage multiplication controlling signal generating section 87. In the voltage multiplication controlling signal generating section 87, the output of the inverter circuit 136 is transmitted via inverter circuits 137 and 139 to an output terminal C1. Further, the output of the inverter circuit 136 is transmitted via the inverter 138 to an output terminal C1.

From the selecting section 83, the output of the inverter circuit 135 is transmitted to the NAND circuit 91. The other two input terminals of the NAND circuit 91 are connected with the input terminal TWOB and the input terminal ONEB. The output of the NAND circuit 91 is transmitted via the inverter circuit 92 to an inverter circuit 136 of the voltage multiplication controlling signal generating section 88.

From the voltage multiplication controlling signal generating section 88, the output of the inverter circuit 136 is transmitted via inverter circuits 137 and 139 to an output terminal C2. Further, the output of the inverter circuit 136 is transmitted via the inverter circuit 138 to an output terminal C3.

In the selecting section 84, the input terminals of an AND circuit 130 are connected with the input terminal CK4 and the input terminal FOUR. The input terminals of an AND circuit 131 are connected with the input terminal CK3 and the input terminal THREE. The input terminals of an AND circuit 132 are connected with the input terminal CK2 and the input terminal TWO. The two input terminals of an AND circuit 133 are connected with the input terminal ONE.

From the selecting section 84, the output of the inverter circuit 135 is transmitted to an inverter circuit 136 of the voltage multiplication controlling signal generating section 89. From the voltage multiplication controlling signal generating section 89, the output of the inverter circuit 136 is transmitted via inverter circuits 137 and 139 to an output terminal D0. Further, the output of the inverter circuit 136 is transmitted via the inverter circuit 138 to an output terminal D1.

From the selecting section 84, the output of the inverter 135 is transmitted to the NAND circuit 93. The other three input terminals of the NAND circuit 93 are connected with the input terminal THREEB, the input terminal TWOB, and the input terminal ONEB. The output of the NAND circuit 93 is transmitted via the inverter circuit 94 to an inverter circuit 136 of the voltage multiplication controlling signal generating section 90.

From the voltage multiplication controlling signal generating section 90, the output of the inverter circuit 136 is transmitted via inverter circuits 137 and 139 to an output terminal D2. Further, the output of the inverter circuit 136 is transmitted via the inverter circuit 138 to an output terminal D3.

Here, the following explanation discusses the operation of the selecting section 81. The voltage multiplication pulse signal CK1 is applied to the input terminal CK1 with a predetermined period and phase. When the voltage multiplication pulse signal CK1 is at a high level, a high-level signal is inputted via any one of the input terminals FOUR, THREE, and TWO (corresponding to the voltage multiplication level: four, three, and two times of the power source voltage) to the AND circuit 130, 131, or 132, so that the high-level signal is outputted from the selecting section 81. Meanwhile, the power source voltage VEE (high level) is normally applied to the AND circuit 133; thus, when a high-level signal is inputted via the input terminal ONE to the AND circuit 133, the high-level signal is outputted from the selecting section 81. In other cases, a low-level signal is outputted from the selecting section 81.

When the selecting section 81 outputs a high-level signal, the voltage multiplication controlling signal generating section 85 outputs a low-level signal to the output terminal A1 and a high-level signal to the output terminal A0.

Moreover, when the selecting section 81 outputs a low-level signal, the voltage multiplication controlling signal generating section 85 outputs a high-level signal to the output terminal A1 and a low-level signal to the output terminal A0.

Here, the following explanation discusses an operation of the selecting section 82. The voltage multiplication pulse signal CK2 is applied to the input terminal CK2 with a predetermined period and phase. When the voltage multiplication pulse signal CK2 is at a high level, a high-level signal is inputted via any one of the input terminals FOUR, THREE, and TWO (corresponding to the voltage multiplication level: four, three, and two times of the power source voltage) to the AND circuit 130, 131, or 132, so that the high-level signal is outputted from the selecting section 82. In other cases, a low-level signal is outputted from the selecting section 82.

Further, a ground-level voltage is normally applied to the AND circuit 133, so that the output of the AND circuit 133 normally becomes a low level regardless of a signal inputted via the input terminal ONE. Therefore, the output of the selecting section 82 is not affected by a signal inputted via the input terminal ONE.

When the selecting section 82 outputs a high-level signal, the voltage multiplication controlling signal generating section 86 outputs a low-level signal to the output terminal B0 and a high-level signal to the output terminal B1.

Moreover, when the selecting section 82 outputs a low-level signal, the voltage multiplication controlling signal generating section 86 outputs a high-level signal to the output terminal B0 and a low-level signal to the output terminal B1.

Here, the following explanation discusses an operation of the selecting section 83. The voltage multiplication pulse signal CK3 is applied to the input terminal CK3 with a predetermined period and phase. When the voltage multiplication pulse signal CK3 is at a high level, a high-level signal is inputted via any one of the input terminals FOUR, and THREE (corresponding to the voltage multiplication level: four or three times the power source voltage) to the AND circuit 130 or 131, so that the high-level signal is outputted from the selecting section 83. Furthermore, the voltage multiplication pulse signal CK2 and a signal from the input terminal TWO are inputted to the AND circuit 132; thus, merely when the voltage multiplication pulse signal CK2 is at a high level and the input terminal TWO is at a high level, the selecting section 83 outputs a high-level signal. In other cases, the selecting section 83 outputs a low-level signal.

Further, a ground-level voltage is normally applied to the AND circuit 133, so that the output of the AND circuit 133 normally becomes a low level regardless of a signal inputted via the input terminal ONE. Therefore, the output of the selecting section 83 is not affected by a signal inputted via the input terminal ONE.

When the selecting section 83 outputs a high-level signal, the voltage multiplication controlling signal generating section 87 outputs a low-level signal to the output terminal C1 and a high-level signal to the output terminal C1.

A high-level signal is inputted from the selecting section 83 to the NAND circuit 91. To the NAND circuit 91, signals are inputted from the input terminal TWOB and the input terminal ONEB. When the input terminal FOUR or the input terminal THREE is at a high level (corresponding to the voltage multiplication level: four or three times the power source voltage), the input terminal TWOB and the input terminal ONEB are at a high level, so that the output of the NAND circuit 91 becomes a low level. The low-level signal from the NAND circuit 91 is changed into a high-level signal in the inverter circuit 92 and is transmitted to the voltage multiplication controlling signal generating section 88. As a result, the voltage multiplication controlling signal generating section 88 outputs a low-level signal to the output terminal C2 and a high-level signal to the output terminal C3.

Meanwhile, when the voltage multiplication pulse signal CK2 and the input terminal TWO are at a high level (corresponding to a voltage multiplication level: twice the power source voltage), the input terminal TWOB and the input terminal ONEB are respectively at a low level and a high level, so that the output of the NAND circuit 91 becomes a high level. A high-level signal from the NAND circuit 91 is changed into a low-level signal and is transmitted to the voltage multiplication controlling signal generating section 88. As a result, the voltage multiplication controlling signal generating section 88 outputs a high-level signal to the output terminal C2 and a low-level signal to the output terminal C3.

Moreover, when the selecting section 83 outputs a low-level signal, the voltage multiplication controlling signal generating section 87 outputs a high-level signal to the output terminal C0 and a low-level signal to the output terminal C1.

Further, when the selecting section 83 outputs a low-level signal, a high-level signal is inputted from the NAND circuit 91 to the inverter circuit 92, so that a low-level signal is inputted from the inverter circuit 92 to the voltage multiplication controlling signal generating section 88. As a result, the voltage multiplication controlling signal generating section 88 outputs a high-level signal to the output terminal C2 and a low-level signal to the output terminal C3.

Here, the following explanation discusses an operation of the selecting section 84. The voltage multiplication pulse signals CK4 is applied to the input terminal CK4 with a predetermined period and phase. When the voltage multiplication pulse signal CK4 is at a high level, a high-level signal is inputted via the input terminal FOUR (corresponding to the voltage multiplication level: four times the power source voltage) to the AND circuit 130, so that the high-level signal is outputted from the selecting section 84. Furthermore, the voltage multiplication pulse signal CK3 and a signal from the input terminal THREE are inputted to the AND circuit 131; thus, merely when the voltage multiplication pulse signal CK3 is at a high level and the input terminal THREE is at a high level, the selecting section 84 outputs a high-level signal. In the same manner, the voltage multiplication pulse signal CK2 and a signal from the input terminal TWO are inputted to the AND circuit 132; thus, merely when the voltage multiplication pulse signal CK2 is at a high level and the input terminal TWO is at a high level, the selecting section 84 outputs a high-level signal. Additionally, to the two inputs of the AND circuit 133, a high-level signal is inputted via the input terminal ONE, merely when the voltage multiplication level is one time of the power source voltage. Merely in this case, the selecting section 84 outputs a high-level signal. In other cases, the selecting section 84 outputs a low-level signal.

When the selecting section 84 outputs a high-level signal, the voltage multiplication controlling signal generating section 89 outputs a low-level signal to the output terminal D0 and a high-level signal to the output terminal D1.

A high-level signal is inputted from the selecting section 84 to the NAND circuit 93. To the NAND circuit 93, signals are inputted from the input terminals THREEB, TWOB, and ONEB. When the input terminal FOUR is at a high level (corresponding to the voltage multiplication level: four times the power source voltage), the input terminals THREEB, TWOB, and ONEB are at a high level, so that the output of the NAND circuit 91 becomes a low level. The low-level signal from the NAND circuit 93 is changed into a high-level signal in the inverter 94 and is transmitted to the voltage multiplication controlling signal generating section 90. As a result, the voltage multiplication controlling signal generating section 90 outputs a low-level signal to the output terminal D2 and a high-level signal to the output terminal D3.

When the input terminal THREE, TWO, or ONE is at a high level (corresponding to the voltage multiplication level: three, two, or one times of the power source voltage), the input terminal THREEB, TWOB, or ONEB is at a low level, so that the output of the NAND circuit 93 becomes a high level. The high-level signal from the NAND circuit 93 is changed into a low-level signal in the inverter circuit 94 and is transmitted to the voltage multiplication controlling signal generating section 90. As a result, the voltage multiplication controlling signal generating section 90 outputs a high-level signal to the output terminal D2 and a low-level signal to the output terminal D3. Additionally, when the input terminal ONE is at a high level, the selecting section 84 outputs a high-level signal regardless of the voltage multiplication signals CK1 through CK4.

Additionally, when the selecting section 84 outputs a low-level signal, the voltage multiplication controlling signal generating section 89 outputs a high-level signal to the output terminal D0 and a low-level signal to the output terminal D1.

Further, when the selecting section 84 outputs a low-level signal, a high-level signal is inputted from the NAND circuit 93 to the inverter circuit 94, so that a low-level signal is inputted from the inverter circuit 94 to the voltage multiplication controlling signal generating section 90. As a result, the voltage multiplication controlling signal generating section 90 outputs a high-level signal to the output terminal D2 and a low-level signal to the output terminal D3.

The output terminals of the voltage multiplication pulse selecting circuit 80 are respectively connected with the corresponding input terminals of the voltage multiplication level outputting circuit 100. Here, referring to FIG. 4, the following explanation discusses the circuit construction of the voltage multiplication level outputting section 100.

Figure 4:
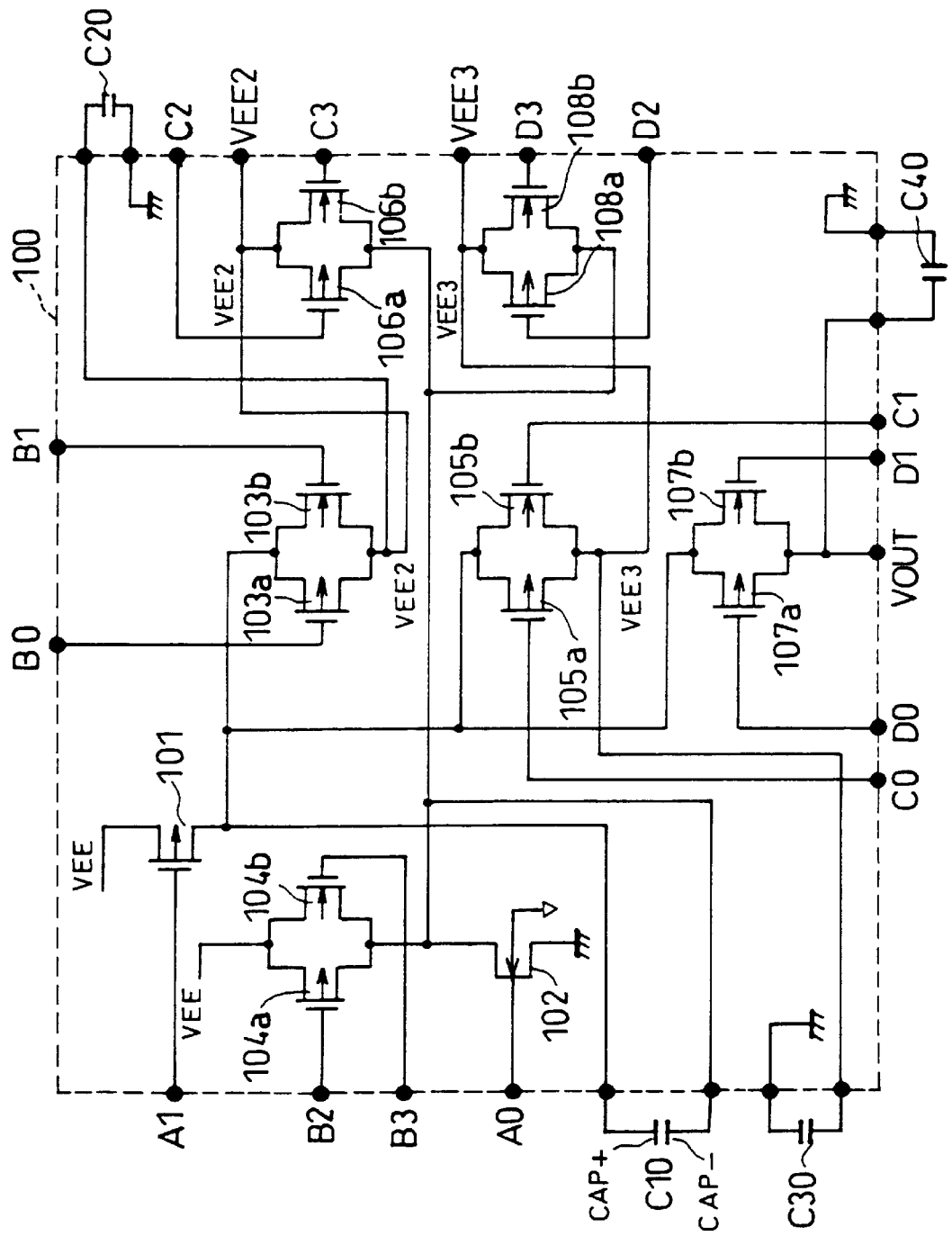
FIG. 4 is a circuit diagram showing an example of a circuit construction of a voltage multiplication level outputting circuit with regard to the voltage multiplying device.

As shown in FIG. 4, in the voltage multiplication level outputting section 100, the input terminal A1 is connected with the gate of a P channel MOS 101. As for the P channel MOS 101, the source is connected with a power source voltage VEE, and the drain is connected with one of the electrodes (extended as an output terminal $CAP_+$) of an electric charge supplying capacitor C10 (external capacitor). The other electrode (extended as an output terminal $CAP_-$) of the electric charge supplying capacitor C10 is connected with the drain of an N channel MOS 102. As for the N channel MOS 102, the gate is connected with the input terminal A0 and the source is connected with the ground.

The drain of the N channel MOS 102 is connected with the drain of a P channel MOS 104a and the drain of an N channel MOS 104b. As for the P channel MOS 104a , the source is connected with the power source voltage VEE and the gate is connected with the input terminal B2. Further, as for the N channel MOS 104b, the source is connected with the power source voltage VEE and the gate is connected with the input terminal B3.

The drain of the P channel MOS 101 is connected with the source of a P channel MOS 103a and the source of an N channel MOS 103b. As for the P channel MOS 103a, the gate is connected with the input terminal B0, and the drain is connected with one of the electrodes of a smoothing capacitor C20. Moreover, as for the N channel MOS 103b, the gate is connected with the input terminal B1, and the drain is connected with the electrode of the smoothing capacitor C20. The other electrode of the smoothing capacitor C20 is connected with the ground. Here, the smoothing capacitor C20 is an external component of the circuit.

The drain of the P channel MOS 103a is connected with the source of a P channel MOS 106a and the source of an N channel MOS 106b, and is extended to the outside as an output terminal VEE2. As for the P channel MOS 106a, the gate is connected with the input terminal C2, and the drain is connected with the drain of the N channel MOS 102. Further, as for the N channel MOS 106b, the gate is connected with the input terminal C3, and the drain is connected with the drain of the N channel MOS 102.

The drain of the P channel MOS 101 is connected with the source of a P channel MOS 105a and the source of an N channel MOS 105b. As for the P channel MOS 105a, the gate is connected with the input terminal C0, and the drain is connected with the source of an N channel MOS 108a (described later) and is extended to the outside as an output terminal VEE3. Further, as for the N channel MOS 105b, the gate is connected with the input terminal C1, and a smoothing capacitor C30 is provided between the drain and the ground. Here, the smoothing capacitor C30 is an external component of the circuit.

The source of the P channel MOS 105a is connected with the source of a P channel MOS 107a. As for the P channel MOS 107a, the gate is connected with the input terminal D0, and the drain is extended to the outside as an output terminal VOUT together with the drain of a N channel MOS 107b. Further, as for the N channel MOS 107b, the gate is connected with the input terminal D1, and a smoothing capacitor C40 is provided between the drain and the ground. Here, the smoothing capacitor C40 is an external component of the circuit.

The drain of the P channel MOS 106a is connected with the drain of the P channel MOS 108a. As for the P channel MOS 108a, the gate is connected with the input terminal D2. Further, as for the N channel MOS 108b, the gate is connected with the input terminal D3, and the drain is connected with the drain of the P channel MOS 108a.

Here, the following explanation fully describes the operation of the voltage multiplying device having the above-mentioned construction in accordance with the present embodiment.

Firstly, in the voltage multiplying level setting resister circuit 50, when the voltage multiplying level is adjusted at one time, the resister values BS1 and BS0 are set at (BS1, BS0)=(1, 1). This setting allows a high-level signal to be transmitted from the condition decoder circuit 60 merely to the input terminal ONE of the voltage multiplication pulse selecting circuit 80, among the input terminals FOUR, THREE, TWO, and ONE. With this arrangement, the voltage multiplication pulse selecting circuit 80 recognizes that the voltage multiplication level is adjusted at one time. Namely, the power source voltage is outputted just as it is.

Without depending upon the voltage multiplication pulse signals CK1 through CK4, the voltage multiplication pulse selecting circuit 80 outputs a high-level signal from the output terminal A0, a low-level signal from the output terminal A1, a low-level signal from the output terminal D0, and a high-level signal from the output terminal D1 respectively to the corresponding input terminals of the voltage multiplication level outputting circuit 100. As a result, in the voltage multiplication level outputting circuit 100, the P channel MOS 101, the N channel MOS 102, the P channel MOS 107$a$, and the N channel MOS 107$b$ are respectively turned on. With this operation, the electric charge supplying capacitor C10 is charged by the power source voltage VEE, and the potential of the output terminal CAP$_+$ (VEE) is outputted from the output terminal VOUT via the P channel MOS 107$a$ and the N channel MOS 107$b$. Additionally, the potential difference VEE (voltage of one time of the power source voltage VEE) can be retrieved between the output terminal CAP$_+$ and the output terminal CAP$_-$ to the outside.

Next, in the voltage multiplying level setting resister circuit 50, when the voltage multiplying level is adjusted at twice, the resister values BS1 and BS0 are set at (BS1, BS0)=(1, 0). This setting allows a high-level signal to be transmitted from the condition decoder circuit 60 merely to the input terminal TWO of the voltage multiplication pulse selecting circuit 80, among the input terminals FOUR, THREE, TWO, and ONE. With this arrangement, the voltage multiplication pulse selecting circuit 80 recognizes that the voltage multiplication level is adjusted at twice.

In the voltage multiplication pulse selecting circuit 80, in synchronization with the voltage multiplication pulse CK1 (in synchronization with the high level of the voltage multiplication pulse CK1), a high-level signal is outputted from the output terminal A0 and a low-level signal is outputted from the output terminal A1, respectively to the corresponding input terminals of the voltage multiplication level outputting circuit 100. As a result, in the voltage multiplication level outputting circuit 100, the P channel MOS 101 and the N channel MOS 102 are respectively turned on. With this operation, the electric charge supplying capacitor C10 is charged by the power source voltage VEE, and the potential of the output terminal CAP$_+$ becomes VEE. Therefore, the potential difference of VEE can be retrieved between the output terminal CAP$_+$ and the output terminal CAP$_-$ to the outside.

Afterwards, when the voltage multiplication pulse signal CK1 becomes a low-level signal in accordance with the timing of FIG. 5, the P channel MOS 101 and the N channel MOS 102 are respectively turned off. And then, when the voltage multiplication pulse signal CK2 is changed from a low level to a high level in accordance with the timing of FIG. 5, in synchronization with the change, low-level signals are outputted from the output terminals B0 and B2, and high-level signals are outputted from the output terminals B1 and B3, respectively to the corresponding input terminals of the voltage multiplication level outputting circuit 100. As a result, in the voltage multiplication level output circuit 100, the P channel MOS 104$a$ and the N channel MOS 104$b$ are respectively turned on, so that the potential of the output terminal CAP$_-$ is increased to the power source voltage VEE. Therefore, the potential of the output terminal CAP$_+$ is added by the power source voltage VEE to 2VEE.

Meanwhile, when the voltage multiplication pulse signal CK2 is changed from a low-level signal to a high-level signal in accordance with the timing of FIG. 5, in synchronization with the change, low-level signals are outputted from the output terminals C1 and D0, and high-level signals are outputted from the output terminals C1 and D1, respectively to the corresponding input terminals of the voltage multiplication level outputting circuit 100. As a result, in the voltage multiplication level outputting circuit 100, the P channel MOS 105$a$, the P channel MOS 107$a$, the N channel MOS 105$b$, and the N channel MOS 107$b$ are respectively turned on, so that the doubled potential 2VEE is outputted via the P channel MOS 107$a$ and the N channel MOS 107$b$ to the output terminal VOUT, and via the P channel MOS 103$a$ and the N channel MOS 103$b$ to the output terminal VEE2.

Additionally, when the voltage multiplication level is twice, all the MOSs are turned off at the timings of the voltage multiplication pulse signals CK3 and CK4, and they are not turned on.

As described above, the above-described operation is repeatedly performed in accordance with the timings of the voltage multiplication pulse signals CK1 through CK4, which are repeatedly inputted. The potential of VEE is outputted from the output terminal CAP$_+$ for each period of the voltage multiplication pulse signal CK1, and the potential of 2VEE, which is twice the power source voltage, is outputted from the output terminal VOUT and the output terminal VEE2 for each period of the voltage pulse signal CK2.

Next, in the voltage multiplying level setting resister circuit 50, when the voltage multiplying level is adjusted at three times, the resister values BS1 and BS0 are set at (BS1, BS0)=(0, 1). This setting allows a high-level signal to be transmitted from the condition decoder circuit 60 merely to the input terminal THREE of the voltage multiplication pulse selecting circuit 80, among the input terminals FOUR, THREE, TWO, and ONE. With this arrangement, the voltage multiplication pulse selecting circuit 80 recognizes that the voltage multiplication level is adjusted at three times.

In the voltage multiplication pulse selecting circuit 80, in synchronization with the voltage multiplication pulse signal CK1 (in synchronization with the high level of the voltage multiplication pulse signal CK1), a high-level signal is outputted from the output terminal A0 and a low-level signal is outputted from the output terminal A1, respectively to the corresponding input terminals of the voltage multiplication level outputting circuit 100. As a result, in the voltage multiplication level outputting circuit 100, the P channel MOS 101 and the N channel MOS 102 are respectively turned on. With this operation, the electric charge supplying capacitor C10 is charged by the power source voltage VEE, and the potential of the output terminal CAP$_+$ becomes VEE. Therefore, the potential difference VEE can be retrieved between the output terminal CAP$_+$ and the output terminal CAP$_-$ to the outside.

Afterwards, when the voltage multiplication pulse signal CK1 becomes a low-level signal in accordance with the timing of FIG. 5, the P channel MOS 101 and the N channel MOS 102 are respectively turned off. And then, when the voltage multiplication pulse signal CK2 is changed from a low level to a high level in accordance with the timing of FIG. 5, in synchronization with the change, low-level signals are outputted from the output terminals B0 and B2, and high-level signals are outputted from the output terminals B1 and B3, respectively to the corresponding input terminals of the voltage multiplication level outputting circuit 100. As a result, in the voltage multiplication level outputting circuit 100, the P channel MOS 104a and the N channel MOS 104b are respectively turned on, so that the potential of the output terminal CAP_ is increased to the power source voltage VEE. Therefore, the potential of the output terminal CAP$_+$ is added by the power source voltage VEE to 2VEE. The P channel MOS 103a and the N channel MOS 103b are respectively turned on, so that the doubled potential 2VEE is outputted via the P channel MOS 103a and the N channel MOS 103b to the output terminal VEE2. With this operation, the voltage across the smoothing capacitor C20 becomes 2VEE. Additionally, in this case, all the other MOSs are turned off at the timing of the voltage multiplication pulse signal CK2, and they are not turned on.

Next, when the voltage multiplication pulse signal CK2 becomes a low-level signal in accordance with the timing of FIG. 5, the P channel MOS 103a, the P channel MOS 104a, the N channel MOS 103b, and the N channel MOS 104b are respectively turned off. At this time, the smoothing capacitor C20 makes it possible to maintain the electric charge so as to keep the potential at 2VEE between the output terminal VEE2 and the ground.

And then, when the voltage multiplication pulse signal CK3 is changed from a low-level signal to a high-level signal in accordance with the timing of FIG. 5, in synchronization with the change, low-level signals are outputted from the output terminals C0 and C2, and high-level signals are outputted from the output terminals C1 through C3, respectively to the corresponding input terminals of the voltage multiplication level outputting circuit 100. As a result, in the voltage multiplication level outputting circuit 100, the P channel MOS 106a and the N channel MOS 106b are respectively turned on, so that the potential 2VEE of the output terminal VEE2 is applied to the output terminal CAP_, and the potential of the output terminal CAP_ is increased to 2VEE. Therefore, the potential of the output terminal CAP$_+$ (VEE) is added by the potential 2VEE to 3VEE. Additionally, the P channel MOS 105a and the N channel MOS 105b are respectively turned on, so that the potential of 3VEE is outputted to the output terminal VEE3. With this operation, the smoothing capacitor C30 is charged, so that the voltage across the smoothing capacitor C30 becomes 3VEE.

Meanwhile, when the voltage multiplication pulse signal CK3 is changed from a low-level signal to a high-level signal, in synchronization with the change, a low-level signal is outputted from the output terminal D0 and a high-level signal is outputted from the output terminal D1, respectively to the corresponding input terminals of the voltage multiplication level outputting circuit 100. As a result, in the voltage multiplication level outputting circuit 100, the P channel MOS 107a and the N channel MOS 107b are respectively turned on, so that the tripled potential 3VEE is outputted via the P channel MOS 107a and the N channel MOS 107b to the output terminal VOUT.

Additionally, when the voltage multiplication level is three times, the P channel MOS 108a and the N channel MOS 108b are turned off at the timing of the voltage multiplication pulse signal CK3, and they are not turned on.

As described above, the above-mentioned operation is repeatedly performed in accordance with the timings of the voltage multiplication pulse signals CK1 through CK4 which are repeatedly inputted, so that the output terminal CAP$_+$ outputs VEE for each period of the voltage multiplication pulse signal CK1, the output terminal VOUT and the output terminal VEE2 output the potential 2VEE which is twice the power source voltage for each period of the voltage multiplication pulse signal CK2, the output terminal VEE3 outputs the potential 3VEE which is three times the power source voltage for each period of the voltage multiplication pulse signal CK3, and the output terminal VOUT outputs the potential 3VEE which is three times the power source voltage for each period of the voltage multiplication pulse signal CK3.

Finally, the following explanation describes a case in which the voltage multiplication level is adjusted at four times in the voltage multiplication level setting resister circuit 50. In this case, the resister values BS1 and BS0 are set at (BS1, BS0)=(0, 0). This setting allows a high-level signal to be transmitted from the condition decoder circuit 60 merely to the input terminal FOUR of the voltage multiplication pulse selecting circuit 80, among the input terminals FOUR, THREE, TWO, and ONE. With this arrangement, the voltage multiplication pulse selecting circuit 80 recognizes that the voltage multiplication level is adjusted at four times.

In the voltage multiplication pulse selecting circuit 80, in synchronization with the voltage multiplication pulse signal CK1 (in synchronization with the high level of the voltage multiplication pulse signal CK1), a high-level signal is outputted from the output terminal A0 and a low-level signal is outputted from the output terminal A1, respectively to the corresponding input terminals of the voltage multiplication level outputting circuit 100. As a result, in the voltage multiplication level outputting circuit 100, the P channel MOS 101 and the N channel MOS 102 are respectively turned on. With this operation, the electric charge supplying capacitor C10 is charged by the power source voltage VEE, and the potential of the output terminal CAP$_+$ becomes VEE. Therefore, the potential difference VEE can be retrieved between the output terminal CAP$_+$ and the output terminal CAP_ to the outside.

Afterwards, when the voltage multiplication pulse signal CK1 becomes a low-level signal in accordance with the timing of FIG. 5, the P channel MOS 101 and the N channel MOS 102 are respectively turned off. And then, when the voltage multiplication pulse signal CK2 is changed from a low level to a high level in accordance with the timing of FIG. 5, in synchronization with the change, low-level signals are outputted from the output terminals B0 and B2, and high-level signals are outputted from the output terminals B1 and B3, respectively to the corresponding input terminals of the voltage multiplication level outputting circuit 100. As a result, in the voltage multiplication level outputting circuit 100, the P channel MOS 104a and the N channel MOS 104b are respectively turned on, so that the potential of the output terminal CAP_ is increased to the power source voltage VEE. Therefore, the potential of the output terminal CAP$_+$ is added by the increased power source voltage VEE to 2VEE. The P channel MOS 103a and the N channel MOS 103b are respectively turned on, so that the doubled potential 2VEE is outputted via the P channel MOS 103a and the N channel MOS 103b to the output terminal VEE2. With this operation, the voltage across the smoothing capacitor C20 becomes 2VEE. Additionally, in this case, all the other MOSs are turned off at the timing of the voltage multiplication pulse signal CK2, and they are not turned on.

Next, when the voltage multiplication pulse signal CK2 becomes a low-level signal in accordance with the timing of FIG. 5, the P channel MOS 103a, the P channel MOS 104a, the N channel MOS 103b, and the N channel MOS 104b are respectively turned off. And then, when the voltage multiplication pulse signal CK3 is changed from a low level to a high level in accordance with the timing of FIG. 5, in synchronization with the change, low-level signals are outputted from the output terminals C1 and C2, and high-level signals are outputted from the output terminals C1 and C3, respectively to the corresponding input terminals of the voltage multiplication level outputting circuit 100. As a result, in the voltage multiplication level outputting circuit 100, the P channel MOS 106a and the N channel MOS 106b are respectively turned on, so that the potential of the output terminal CAP_ is increased to the power source voltage 2VEE. Therefore, the potential of the output terminal CAP$_+$ is added by the power source voltage 2VEE to 3VEE. The P channel MOS 105a and the N channel MOS 105b are respectively turned on, so that the tripled potential 3VEE is outputted to the output terminal VEE3. With this operation, the smoothing capacitor C30 is charged so as to have a voltage of 3VEE thereacross. Additionally, in this case, all the other MOSs are turned off at the timing of the voltage multiplication pulse signal CK3, and they are not turned on.

Afterwards, when the voltage multiplication pulse signal CK3 becomes a low-level signal in accordance with the timing of FIG. 5, the P channel MOS 105a, the P channel MOS 106a, the N channel MOS 105b, and the N channel MOS 106b are respectively turned off. And then, when the voltage multiplication pulse signal CK4 is changed from a low level to a high level in accordance with the timing of the FIG. 5, in synchronization with the change, the output terminal D2 outputs a low-level signal and the output terminal D3 outputs a high-level signal, respectively to the corresponding input terminals of the voltage multiplication level outputting circuit 100. As a result, in the voltage multiplication level outputting circuit 100, the P channel MOS 108a and the N channel MOS 108b are respectively turned on, so that the potential 3VEE of the output terminal VEE3 is applied to the output terminal CAP_, and the potential of the output terminal CAP_ is increased to 3VEE. Therefore, the potential of the output terminal CAP$_+$ (VEE) is added by the potential 3VEE to 4VEE.

Meanwhile, when the voltage multiplication pulse signal CK4 is changed from a low-level signal to a high-level signal in accordance with the timing of FIG. 5, in synchronization with the change, a low-level signal is outputted from the output terminal D0, and a high-level signal is outputted from the output terminal D1, respectively to the corresponding input terminals of the voltage multiplication level outputting circuit 100. As a result, in the voltage multiplication level outputting circuit 100, the P channel MOS 107a and the N channel MOS 107b are respectively turned on, so that the quadrupled potential 4VEE is outputted via the P channel MOS 107a and the N channel MOS 107b to the output terminal VOUT.

As described above, the above-mentioned operation is repeatedly performed in accordance with the timings of the voltage multiplication pulse signals CK1 through CK4 which are repeatedly inputted, so that the output terminal CAP$_+$ outputs VEE for each period of the voltage multiplication pulse signal CK1, the output terminal VOUT and the output terminal VEE2 output the potential 2VEE which is twice the power source voltage for each period of the voltage multiplication pulse signal CK2, the output terminal VEE3 outputs the potential 3VEE which is three times the power source voltage for each period of the voltage multiplication pulse signal CK3, and the output terminal VOUT outputs the potential 4VEE which is four times the power source voltage for each period of the voltage multiplication pulse signal CK4.

As described above, a voltage multiplying device of the present embodiment makes it possible to achieve a plurality of voltage multiplication levels which is an integral multiple of a source voltage, and to set a resister value of a voltage multiplication level setting resister 50 by entering a command through a device such as an external inputting device, so that the voltage multiplication level can be readily set without changing an external circuit.

Namely, the voltage multiplying device of the present embodiment makes it possible to obtain an integral multiple of a source voltage in a plurality of voltage multiplication levels by using a single voltage multiplying device, and allows the user to freely set the voltage multiplication level; thus, it is not necessary to make the setting again from the start in order to meet a specification desired by the user, so that commonality of the system can be readily realized. In addition, it is not necessary to change the arrangement including an external circuit wiring for each specification, so that the voltage multiplying device is quite suitable for mass production.

Further, the voltage multiplying device of the present embodiment can be used as a power source of a liquid crystal driving driver of a display device such as a liquid crystal driving device. Additionally, with regard to a system construction whose required voltage value is different for each maker, it is not necessary to develop a liquid crystal driving driver in accordance with a power source specification of the user; consequently, the voltage multiplying device can be used as a power source which is superior in versatility.

As described above, a first voltage multiplying device of the present invention is characterized by having the following arrangement for multiplying the power source voltage:

Namely, the first voltage multiplying device is characterized by including: a voltage multiplication level setting circuit for setting a voltage multiplying level which indicates how many times the power source voltage is multiplied; a voltage multiplication pulse signal generating circuit for outputting a plurality of voltage multiplication pulse signals which respectively have predetermined periods and respectively vary with predetermined phase differences; a voltage multiplication controlling circuit for outputting a voltage multiplication controlling signal, which varies in accordance with the determined voltage multiplication level, in synchronization with the voltage multiplication pulse signal; and a voltage multiplication level outputting circuit for multiplying the power source voltage step by step to the determined voltage multiplication level in accordance with the voltage multiplication controlling signal and for outputting the voltage multiplication level in each of the steps.

With the above-mentioned invention, the power source voltage is multiplied step by step to a desired voltage multiplication level and is outputted as follows:

Namely, a desired voltage multiplication level is set by the voltage multiplication level setting circuit. From the voltage multiplication pulse signal generating circuit, a plurality of voltage multiplication pulses are generated and respectively outputted to the voltage multiplication controlling circuit. These voltage multiplication pulse signals respectively have predetermined periods and respectively vary with predetermined phase differences.

The voltage multiplication controlling circuit generates the voltage multiplication controlling signal, which varies in accordance with the voltage multiplication level determined by the voltage multiplication level setting circuit, in synchronization with the voltage multiplication pulse signal, and outputs the voltage multiplication controlling signal to the voltage multiplication level outputting circuit. Upon reception of the voltage multiplication controlling signal, the voltage multiplication level outputting circuit multiplies the power source voltage step by step to the determined voltage multiplication level in accordance with the voltage multiplication controlling signal, and outputs each of the voltage multiplication levels of the step-by-step voltage multiplication. In this case, the voltage multiplication controlling signal is synchronous to the voltage multiplication pulse signal, so that each voltage multiplication is carried out in synchronization with the voltage multiplication pulse signal.

As described above, merely by setting the voltage multiplication level by using the voltage multiplication level setting circuit, each of the voltage multiplying operations is repeatedly performed in synchronization with each of the voltage multiplication pulses, the power source voltage is multiplied step by step to the determined voltage multiplication level, and the voltage multiplication levels are respectively outputted. Therefore, it is not necessary to make the setting for each specification desired by the user, and it is possible to install the voltage multiplying device into any kind of system; consequently, commonality of the system can be readily realized. Furthermore, it is not necessary to change an external circuit element or a circuit wiring for each of the determined voltage multiplication levels, so that it is positively possible to provide the voltage multiplying device which is quite suitable for mass production.

As described above, with the arrangement of the first voltage multiplying device, a second voltage multiplying device of the present invention is characterized in that: the voltage multiplication level setting circuit is a resister circuit; and the voltage multiplication controlling circuit is provided with (a) a setting level specifying circuit for specifying the voltage multiplication level which is set by decoding the resister value of the resister circuit, and (b) a voltage multiplication controlling signal generating circuit for outputting the voltage multiplication controlling signal in accordance with the output of the setting level specifying circuit.

According to the above-mentioned invention, the voltage multiplication level setting circuit is a resister circuit; thus, a command is entered by using an external equipments, etc. so as to set the voltage multiplication level for the resister circuit. This arrangement makes it possible to realize a more systematic voltage multiplying device.

The resister value of the resister circuit is decoded by the setting level specifying circuit so as to specify the determined voltage multiplication level. In accordance with the output of the setting level specifying circuit, the voltage multiplication controlling signal is outputted by the voltage multiplication controlling signal generating circuit.

As described above, with the arrangement of the first voltage multiplying device, a third voltage multiplying device of the present invention is characterized in that the voltage multiplying level outputting circuit includes: an electric charge supplying capacitor having a first and second electrodes; a first switching circuit connecting the power source voltage and the first electrode; a second switching circuit connecting the second electrode and the ground; a third switching circuit connecting the power source voltage and the second electrode; a group of outputting switches composed of a plurality of switching circuits which are respectively connected with the first electrode and outputs the potential of the first electrode in a closed state; a group of potential increasing switches composed of a plurality of switches which are provided so as to correspond to the switching circuits of the group of outputting switches, and which apply the potential from the corresponding switching circuit of the group of outputting switches to the second electrode in each closed state so as to increase the potential of the second electrode; and a fourth switching circuit for outputting the potential of the first electrode as a voltage multiplication level of the corresponding step in a closed state.

According to the above-mentioned invention, when the first switching circuit and the second switching circuit go into a closed state, the power source voltage, the electric charge supplying capacitor, and the ground form a closed circuit, so that the electric charge supplying capacitor is charged by the power source voltage.

When the second switching circuit goes into a closed state, the power source voltage is applied to the second electrode of the electric charge supplying capacitor. With this arrangement, the potential of the second electrode is increased to the potential of the power source voltage, so that the potential of the first electrode of the electric charge supplying capacitor is multiplied to the potential which is twice the power source voltage.

In the same manner, the respective switching circuits of the group of outputting switches are connected with the first electrode so as to output the respective potentials of the first electrode (potential difference between the first electrode and the ground) respectively through the switching circuits when the switching circuit is in a closed state.

The switching circuits of the group of potential increasing switches are provided so as to correspond to the switching circuits of the group of outputting switches; thus, in a closed state (for every step), the potential of the corresponding switching circuit of the group of outputting switches is applied to the second electrode. With this arrangement, the potential of the second electrode is increased in accordance with the switching circuit which is in a closed state.

As described above, the potential of the second electrode is increased in accordance with the switching circuit which is in a closed state in the group of potential increasing switches so as to accordingly multiply the potential of the first electrode, and then, the potential of the first electrode is outputted as a determined voltage multiplication level via the fourth switching circuit.

For this reason, the respective switching circuits of the group of the outputting switches are connected with the first electrode so as to output the respective potentials of the first electrode (potential of each multiplication that serves as each of the potential differences between the first electrode and the ground) through the switching circuit which is in a closed state.

Further, the potential of the second electrode is increased so as to accordingly multiply the potential of the first electrode, and then, it is possible to output the potential of the first electrode as a determined voltage multiplication level through the fourth switching circuit.

As described above, with the arrangement of the third voltage multiplying device, a fourth voltage multiplying device is characterized in that: when the power source voltage is multiplied up to n times, n representing an integer of two or more, the voltage multiplication pulse signal generating circuit outputs n voltage multiplication pulse signals including a first through $n_{th}$ voltage multiplication pulse signals; and in the voltage multiplication level outputting circuit, the first and second switching circuits are controlled so as to be in a closed state in synchronization with the first voltage multiplication pulse signal, the electric charge supplying capacitor is charged by the power source voltage, the third switching circuit is controlled so as to be in a closed state in synchronization with the second voltage multiplication pulse signal, and the potential of the power source voltage is applied to the second electrode so as to multiply the potential of the first electrode to the potential which is twice the power source voltage; and thereafter, in the same manner, an open/close state of the group of outputting switches and the group of potential increasing switches is controlled in synchronization with the $n_{th}$ voltage multiplication pulse signal, and a potential which is (n−1) times the power source voltage is applied to the second electrode so as to multiply the potential of the first electrode to a potential which is n times the power source voltage.

According to the above-mentioned invention, when the power source voltage is multiplied up to n times, the voltage multiplication pulse signal generating circuit outputs n voltage multiplication pulse signals including the first through $n_{th}$ voltage multiplication pulse signals, in a periodic manner. The voltage multiplication level outputting circuit is controlled as follows:

Namely, in synchronization with the first voltage multiplication pulse signal, the first and second switching circuits are controlled so as to be in a closed state. With this arrangement, the electric charge supplying capacitor is charged by the power source voltage. And then, the third switching circuit is controlled so as to be in a closed state in synchronization with the second voltage multiplication pulse signal. Consequently, the potential of the power source voltage is applied to the second electrode so as to multiply the potential of the first electrode to the potential twice the power source voltage.

Thereafter, in the same manner, in synchronization with the $n_{th}$ voltage multiplication pulse signal, an open/close state of the switching circuits is controlled with regard to the group of outputting switches and the group of potential increasing switches, and the potential of the (n−1)-times power source voltage is applied to the second electrode. As a result, the potential of the first electrode is multiplied step by step and increased to the potential of the n-times power source voltage in the final step. As described above, the voltage multiplication levels, which are increased through the respective steps, are outputted from the fourth switching circuit in accordance with the voltage multiplication controlling signal outputted in synchronization with the voltage multiplication pulse signal.

For this reason, in synchronization with each of the voltage multiplication pulse signals, it is possible to periodically obtain a potential of two through n times corresponding to voltage multiplication levels of the respective steps, from the group of outputting switches.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A voltage multiplying device for multiplying a power source voltage, comprising:
    a voltage multiplication level setting circuit for setting a voltage multiplying level which indicates how many times said power source voltage is multiplied,
    a voltage multiplication pulse signal generating circuit for outputting a plurality of voltage multiplication pulse signals, each having a predetermined period and varying with a predetermined phase difference,
    a voltage multiplication controlling circuit for outputting a voltage multiplication controlling signal, which varies in accordance with said determined voltage multiplication level, in synchronization with said voltage multiplication pulse signal, and
    a voltage multiplication level outputting circuit for multiplying the power source voltage step by step to the set voltage multiplication level in accordance with said voltage multiplication controlling signal, and for outputting the voltage multiplication level of each step.

2. The voltage multiplying device as defined in claim 1, wherein: said voltage multiplication level setting circuit is a resister circuit, and
    said voltage multiplication controlling circuit includes:
        a setting level specifying circuit for decoding a resister value of said resister circuit so as to specify the set voltage multiplication level, and
        a voltage multiplication controlling signal generating circuit for outputting said voltage multiplication controlling signal in accordance with an output of said setting level specifying circuit.

3. The voltage multiplying device as defined in claim 1, wherein said voltage multiplication level outputting circuit includes:
    an electric charge supplying capacitor having a first and second electrodes,
    a first switching circuit for connecting said power source voltage and said first electrode,
    a second switching circuit for connecting said second electrode and a ground,
    a third switching circuit for connecting said power source voltage and said second electrode,
    a group of outputting switches composed of a plurality of switching circuits, each being connected with said first electrode and outputting a potential of said first electrode in each closed state,
    a group of potential increasing switches composed of a plurality of switches, each being provided so as to correspond to each of the switching circuits of said group of outputting switches and applying a potential from the corresponding switching circuit of said group of outputting switches to said second electrode in each closed state so as to increase the potential of said second electrode, and
    a fourth switching circuit for outputting the potential of said first electrode as a voltage multiplication level of a corresponding step in a closed state.

4. The voltage multiplying device as defined in claim 2, wherein said voltage multiplication level outputting circuit includes:
    an electric charge supplying capacitor having a first and second electrodes,
    a first switching circuit for connecting said power source voltage and said first electrode,
    a second switching circuit for connecting said second electrode and a ground,
    a third switching circuit for connecting said power source voltage and said second electrode,
    a group of outputting switches composed of a plurality of switching circuits, each being connected with said first electrode and outputting a potential of said first electrode in each closed state, a group of potential increasing switches composed of a plurality of switches, each being provided so as to correspond to each of the switching circuits of said group of outputting switches and applying a potential from the corresponding switching circuit of said group of outputting switches to said second electrode in each closed state so as to increase the potential of said second electrode, and a fourth switching circuit for outputting the potential of said first electrode as a voltage multiplication level of a corresponding step in a closed state.

5. The voltage multiplying device as defined in claim 3, wherein: when the power source voltage is multiplied up to n times, n representing an integer of two or more, said voltage multiplication pulse signal generating circuit outputs n voltage multiplication pulse signals including a first through $n_{th}$ voltage multiplication pulse signals; and in said voltage multiplication level outputting circuit, in synchronization with the first voltage multiplication pulse signal, said first and second switching circuits are controlled so as to be in a closed state, said electric charge supplying capacitor is charged by the power source voltage, in synchronization with said second voltage multiplication pulse signal, said third switching circuit is controlled so as to be in a closed state, and a potential of the power source voltage is applied to said second electrode so as to multiply the potential of said first electrode to twice the potential of said power source voltage;

and whereafter, in the same manner, an open/close state of the group of outputting switches and the group of potential increasing switches is controlled in synchronization with the $n_{th}$ voltage multiplication pulse signal, and a potential which is (n−1) times said power source voltage is applied to said second electrode so as to multiply the potential of said first electrode to a potential which is n times the power source voltage.

6. The voltage multiplying device as defined in claim 4, wherein: when the power source voltage is multiplied up to n times, n representing an integer of two or more, said voltage multiplication pulse signal generating circuit outputs n voltage multiplication pulse signals including a first through $n_{th}$ voltage multiplication pulse signals; and in said voltage multiplication level outputting circuit, in synchronization with the first voltage multiplication pulse signal, said first and second switching circuits are controlled so as to be in a closed state, said electric charge supplying capacitor is charged by the power source voltage, in synchronization with said second voltage multiplication pulse signal, said third switching circuit is controlled so as to be in a closed state, and a potential of the power source voltage is applied to said second electrode so as to multiply the potential of said first electrode to twice the potential of said power source voltage;

and whereafter, in the same manner, an open/close state of the group of outputting switches and the group of potential increasing switches is controlled in synchronization with the $n_{th}$ voltage multiplication pulse signal, and a potential which is (n−1) times said power source voltage is applied to said second electrode so as to multiply the potential of said first electrode to a potential which is n times the power source voltage.

7. The voltage multiplying device as defined in claim 3, wherein each of said first through fourth switching circuits is constituted by an MOS transistor.

* * * * *